March 20, 1928.
O. C. K. HUTCHINSON
PROCESS OF CHECKING MOLDS DESIGNED FOR THE MOLDING OF GLASSWARE
Filed May 26, 1925
1,663,306
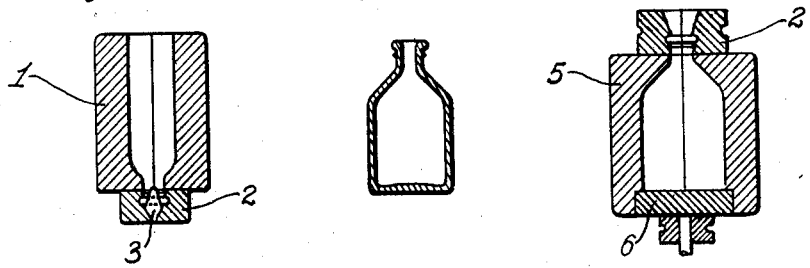
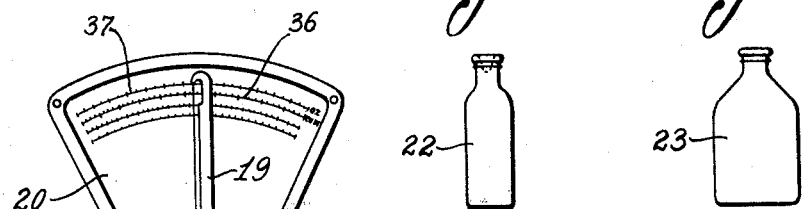
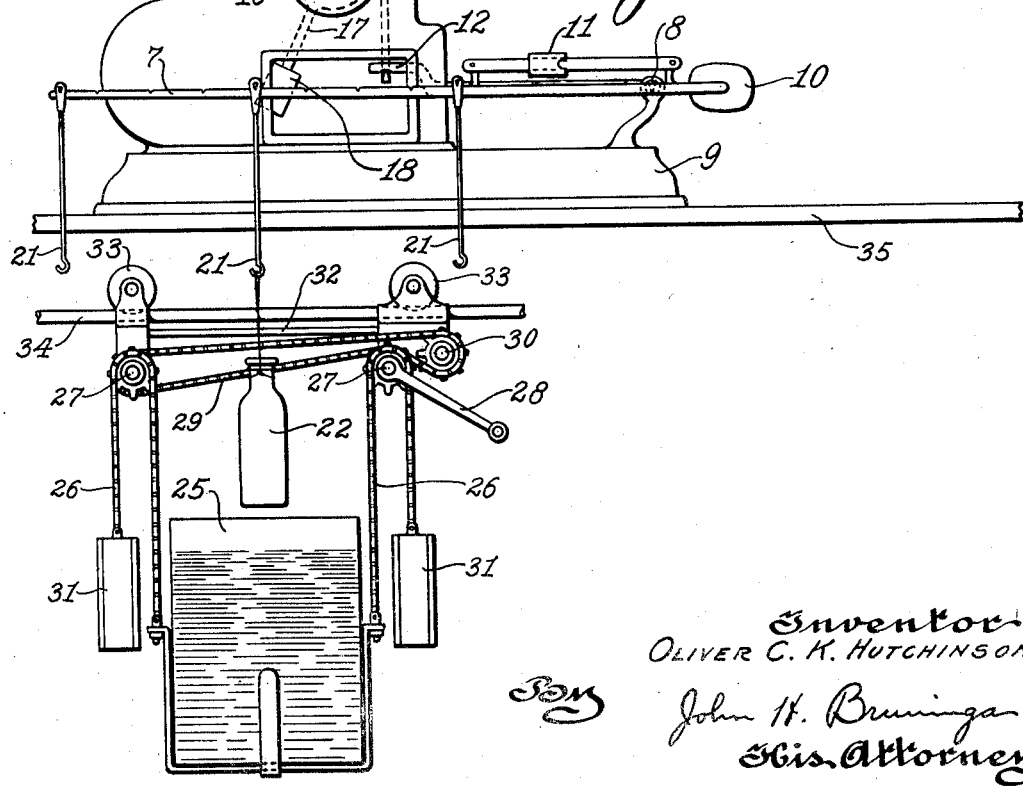

Patented Mar. 20, 1928.

1,663,306

UNITED STATES PATENT OFFICE.

OLIVER C. K. HUTCHINSON, OF ALTON, ILLINOIS, ASSIGNOR TO ILLINOIS GLASS COMPANY, OF ALTON, ILLINOIS, A CORPORATION OF ILLINOIS.

PROCESS OF CHECKING MOLDS DESIGNED FOR THE MOLDING OF GLASSWARE.

Application filed May 26, 1926. Serial No. 111,679.

This invention relates to a process for checking molds for hollow ware such as glass bottles and the like.

In accordance with the practice regularly followed heretofore, when a new article of glass ware such as a bottle is to be produced, two molds must be prepared, a blank mold in which the glass blank from which the bottle is to be formed is first formed, and a finishing mold into which the blank is inserted and then blown in the well known manner so as to fill the finishing mold which forms the finished article. Bottles and such articles are usually made so as to have, when completed, a certain definite capacity of cubic contents. It has been found to be quite a difficult matter to predetermine the molds with such accuracy that the final article will have the shape and capacity desired.

The blank mold must in reality measure off the amount of glass which is to be formed into the finished bottle. This measured amount is then blown in the finishing mold and the relation of the two molds must be such that the interior cavity of the finished bottle will have the desired volume. Obviously the predetermination of the exact sizes of blank and finishing molds is quite difficult so that some simple method of checking these molds is desirable.

In accordance with the usual practice these molds are made up as nearly as possible to the required dimensions and then actual samples in glass are made therefrom. These samples are then checked so as to determine whether the required weight, shape and capacity and weight have been obtained. This method is open to some serious objections. In the first place the process of making samples is an expensive one requiring the operation of a complete bottle forming plant for the sake of a few samples. Such samples are usually run on Sundays or holidays, while regular production work is shut down. The operation is completed in as short a time as possible so as to save expense and consequently the molds and other apparatus are not permitted to attain the same stable conditions of temperature, etc., which they would have during the normal all day operation of regular production. This condition results in causing the samples to vary somewhat from the true form of the molds as would be obtained in regular operation. This is because the glass and the molds both differ somewhat from normal operating temperatures.

It will be seen therefore that this method is unsatisfactory, both on account of the expense and because the samples obtained are not true. In many cases two and even three samples must be taken before the molds are finally brought to their proper form. This means that a delay of three to four weeks in bringing a new shape into production is usually unavoidable.

One of the objects of this invention therefore, is to provide a process for checking molds for glass and other hollow ware by which the accuracy of the molds may be determined without the necessity of making actual samples.

Another object is to provide such a process which will consume less time and cause less delay in bringing a new article into production.

Another object is to provide a process wherein casts of the molds may be made in other materials than those of which the finished article is to be made, and these casts may then be accurately checked.

Further objects will appear from the following description taken in connection with the accompanying drawings in which:

Figure 1 is a cross-sectional view of a blank mold as used in the process embodying this invention.

Figure 2 is a similar view of the finishing mold.

Figure 3 is a cross-sectional view of the finished article made by means of these molds, the case illustrated being that of a bottle.

Figure 4 is a view of a cast of the blank mold shown in Figure 1.

Figure 5 is a similar cast of the finishing mold.

Figure 6 is a view illustrating the apparatus used in the determination of volumes and weights in accordance with this invention.

In accordance with the present invention, a test piece cast is first made of the blank mold in a material which may be put into the mold in fluid or plastic form, and which will set to the shape of the mold. This material should preferably have a very low coefficient of thermal expansion so that the cast will correspond accurately to the mold; sulphur has been found to be a material suitable for this purpose. A similar test piece or cast is then made of the finishing mold. These casts will accurately take the shape each of its own mold, so that the shape of the finishing mold may be accurately checked from the cast by observation and measurement thereof. The volumes of each of these casts is then accurately measured by displacement. Now the cast displacement of the blank mold gives the volume of glass which goes into the making of the bottle, while the cast displacement of the finishing mold gives the outside volume of the finished bottle; accordingly the difference between the volumes of these two casts will be the volume of the interior cavity of the finished bottle. Moreover the cast displacement of the blank mold is proportional to the weight of the glass in the finished bottle. Since each of these volumes of the casts may be determined with great accuracy by displacement, this process provides a very accurate measurement of the capacity and weight of the finished article.

Referring to the accompanying drawings, 1 designates a blank mold, usually formed in two separable halves in order to permit removal of the blank. This mold usually has associated therewith a neck ring 2 which forms the neck of the bottle and serves also to hold the formed blank in the machine during the transfer thereof to the finishing mold, while cooperating with the neck ring is a plunger 3. The finishing mold 5 of usual construction and also formed of separable halves is shown in Fig. 2 as provided with the bottom plate 6. In accordance with this invention the blank mold with the neck ring in place is inverted as shown in Fig. 1 and with the plunger in place; the mold is then poured full of molten sulphur which is allowed to set therein to form a cast 22 as shown in Fig. 4. A similar cast of the finishing mold is then made in upright position as shown in Fig. 2 with the neck ring 2 and bottom plate 6 in place. Accordingly an accurate cast 23 of the outside shape of the bottle is obtained in sulphur as shown in Fig. 5.

The volumes of these casts 22 and 23 can now be determined by displacement; this can be accomplished by an apparatus such as illustrated in Fig. 6. A scale beam is pivoted at 8 in a support 9. This beam is provided with a counterpoise 10 adjusted to balance the beam itself and has a sliding counter weight 11, similar to that used in an ordinary weighing scale but for a purpose as hereinafter described. The beam 7 has an arm 12 which rests on a knife edge on the lower end of a link 13, which in turn has a knife edge bearing on an arm 14 of the weighing mechanism. The arm 14 may be formed on a hub 15, mounted on a knife edge pivot 16 on a frame of the machine and provided with a depending arm 17 carrying a balance weight 18. The hub 15 may also have mounted thereon an index arm 19 adapted to move over a scale card 20, which has a number of scales as hereinafter described. A hanger 21 is suspended from the arm 7 as shown in Figure 6. This hanger may be placed at any point along the arm 7 so as to obtain different ratios for different calibration scales on the card 20, so as to allow for handling casts of a suitable range of weights. In practice a series of hangers may be employed so as to give a quick range. The cast of the blank may then be suspended from a hanger in any suitable manner as by a fine wire as shown.

A water tank or receptacle 25 is suspended as illustrated in Fig. 6, so that it may be elevated. To accomplish this, the tank 25 is suspended by chains 26 from sprockets fixed to shafts 27, one of which has a handle 28, while a chain 29 connects sprockets on shafts 27 and 30 so as to cause the receptacle to be elevated evenly. Weights 31 are provided to counterbalance the receptacle and the water therein. The shafts 27 and 30 are mounted on a carrier 32 having wheels 33 rolling on a track 34 mounted on the support 35 for the scale mechanism, so that the tank may be placed in any desired position along the beam and the hanger or hangers thereon.

The scale cord 20 has a series of sets of scales 36, 37, corresponding in number to the position of the hanger or hangers 21 along the beam 7. The scale 36 is calibrated so as to read directly the volume (as in cubic inches) of the displaced cast, while the scale 37 is calibrated so as to read directly the weight (as in ounces) of glass corresponding to that volume; the scales may, however, be calibrated in accordance with any desired system of measures or weights and in accordance with any desired data required.

In order to find the required volume or weight, the cast is suspended in air from one of the hangers as shown in Fig. 6; this may cause the arm 19 to move to an intermediate point on the scale. The counterweight 11 is now adjusted along the beam so as to bring the arm 19 to the right end of the scale and to the zero position thereon. The tank 25 is now elevated until the cast 22 is submerged; the arm 19 will then move to the left, a distance which represents the buoyancy or the displacement of the cast 22. The scale 36 will then read directly not only the volume of the cast, but the scale 37 will also read directly the weight of the glass corresponding to that volume. By placing the blank mold cast 22 on the mechanism and displacing the same, the volume of the blank mold and the weight of glass required can be directly read. By placing the finishing mold cast 23 on the mechanism and displacing the same the volume of the finishing mold can be readily read. The difference between the volumes of the blank and finishing molds will give the volume or contents of the bottle or container. Each scale is reversely graduated while the pointer is adapted for reverse movement over the scale, while the counterweight is adapted to counterbalance the cast in order to set the index at the zero or datum point on the scale.

It will be clear therefore that this invention provides an improved process for checking molds for hollow ware. By making a test piece or casting of the finishing mold the outside appearance and dimensions of the finished article and the correctness of lettering or designs formed on the surface may be determined and checked from this cast. The volumes of the blank and finishing mold casts are not only determined but measured directly. The weight of the glass required to make the article is also measured directly. Both volumes and weight are measured directly, without calculation, irrespective of the specific gravity of the test cast material. Comparisons of the volumes of the two test casts gives an accurate determination of the inside capacity of the finished article. With sulphur having a low coefficient of expansion, which coefficient is in fact nearly zero, the test casts will have the same size as the interior cavities of the molds to a high degree of accuracy. These casts will therefore approximate the dimensions of the molds much more accurately than would a sample cast in glass taken under conditions of temperature in the apparatus varying widely from normal. By this process also the long delay in taking glass samples is entirely eliminated as well as a very large proportion of the expense involved.

It is obvious that various changes may be made in details without departing from the spirit of this invention; it is, therefore, to be understood that this invention is not to be limited to the specific details shown and described.

Having thus described the invention what is claimed is:

1. The process of checking a mold designed for the molding of a definite article of a predetermined shape or volume and material, comprising, filling the mold cavity with another moldable material so as to form therein a test piece conforming thereto, and measuring the displacement of the test piece in order to determine the accuracy of the mold.

2. The process of checking a mold designed for the molding of a definite article of predetermined shape or volume and material, comprising, filling the mold cavity with a moldable material whose coefficient of expansion is substantially zero so as to form therein a test-piece conforming closely thereto, and measuring the displacement of the test-piece in order to determine the accuracy of the mold.

3. The process of checking a mold designed particularly for the molding of a glass article of a predetermined shape or volume, comprising, pouring molten sulphur into the mold cavity and allowing the same to set therein so as to form therein a test-piece comforming closely thereto and measuring the displacement of the test-piece in order to determine the accuracy of the mold.

4. The process of checking a blank mold designed for the molding of the blank for hollow glass ware, comprising, filling the mold cavity with another moldable material so as to form therein a test piece conforming thereto, and measuring the displacement of the testpiece for comparison with the volume of glass required for the ware in order to determine the accuracy of the mold.

5. The process of checking molds designed for the shaping of hollow glass ware, comprising, filling the mold cavity of a blank mold with another moldable material so as to form therein a test piece conforming thereto, and measuring the displacement of the test piece for comparison with the volume of glass required for the ware in order to determine the accuracy of the mold, and filling the mold cavity of a finishing mold with a moldable material so as to form therein a test piece comforming thereto and measuring the displacement of the test piece for comparison with the volume of the ware in order to determine the accuracy of the mold, and comparing the obtained measurements with each other in order to determine the volume of the interior cavity of the finished ware.

6. The process of coordinately checking blank and finishing molds designed for the molding of the blank and the final molding of hollow glass ware, comprising, filling the mold cavities with another moldable material so as to form therein test pieces conforming respectively thereto, and measuring the displacements of the test pieces for intercomparison in order to check the volume of the glass and ware and the accuracies of the molds.

7. The process of checking a blank mold designed for the molding of the blank for hollow glass ware, comprising, pouring molten sulphur into the blank mold with the plunger and neck ring in place and allowing the same to set therein so as to form therein a test piece conforming closely thereto, and measuring the displacement of the test piece for comparison with the volume of glass required for the ware in order to determine the accuracy of the mold.

8. The process of checking molds designed for the shaping of hollow glass ware, comprising, pouring molten sulphur into a blank mold with the neck ring and bottom plate in place and allowing the same to set therein so as to form therein a test piece conforming closely thereto, and measuring the displacement of the test piece for comparison with the volume of glass required for the ware in order to determine the accuracy of the mold, then pouring molten sulphur into the finishing mold with the neck ring and bottom plate in place and allowing the same to set therein so as to form therein a test piece conforming closely thereto and measuring the displacement of the test piece by comparison with the volume of the ware in order to determine the accuracy of the mold and comparing the obtained measurements with each other in order to determine the volume of the interior cavity of the finished ware.

In testimony whereof I affix my signature this 18 day of May, 1926.

OLIVER C. K. HUTCHINSON.